(12) United States Patent  
Beary

(10) Patent No.: US 7,296,024 B2  
(45) Date of Patent: Nov. 13, 2007

(54) METHOD, APPARATUS, AND COMPUTER PROGRAM PRODUCT FOR AUTOMATICALLY MIGRATING AND MANAGING MIGRATED DATA TRANSPARENTLY TO REQUESTING APPLICATIONS

(75) Inventor: Gregory J. Beary, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 476 days.

(21) Appl. No.: 10/922,077

(22) Filed: Aug. 19, 2004

(65) Prior Publication Data

US 2006/0074916 A1 Apr. 6, 2006

(51) Int. Cl.
*G06F 7/00* (2006.01)
*G06F 15/16* (2006.01)

(52) U.S. Cl. .................. 707/10; 707/100; 707/101; 707/102; 707/104.1; 709/217; 709/218; 709/219; 709/223

(58) Field of Classification Search ............ 707/10, 707/100, 101–102; 709/217–218
See application file for complete search history.

(56) References Cited

U.S. PATENT DOCUMENTS

| 5,640,529 | A |   | 6/1997  | Hasbun        | 395/430 |
| 5,778,390 | A | * | 7/1998  | Nelson et al. | 707/102 |
| 5,822,780 | A |   | 10/1998 | Schutzman     |         |
| 5,966,730 | A |   | 10/1999 | Zulch         | 711/162 |
| 6,088,717 | A | * | 7/2000  | Reed et al.   | 707/10  |

(Continued)

FOREIGN PATENT DOCUMENTS

EP    0 625 756 A1 * 5/1994

(Continued)

OTHER PUBLICATIONS

Duic V. et al: "The COMPASS event store", 2003 IEEE Nuclear Science Symposium Conference Record / 2003 IEEE Nuclear Science Symposium and Medical Imaging Conference, Portland, OR, Oct. 19-25, 2003, IEEE Nuclear Science Symposium Conference Record, New York, NY: IEEE, US, vol. 5 of 5, Oct. 19, 2003, pp. 16-164 vol. 1.

*Primary Examiner*—Cam Y Truong
*Assistant Examiner*—Anh Ly
(74) *Attorney, Agent, or Firm*—Brooks Kushman, P.C.

(57) ABSTRACT

A method, apparatus, and computer program product are disclosed for managing and migrating data. A request is received from an application for data. The request is in a database-specific format. A determination is made regarding whether the data is located in a first database that utilizes the database-specific format. In response to determining that at least part of the data has been migrated from the first database, each current location of each part of the data is identified. A first request is generated for a first location of a first part of the data. The first request is in a database-specific format of the first location. A second request is generated for a second location of a second part of said data. The second request is in a database-specific format of the second location. The first and second parts of the data are combined into a complete result set that includes all of the originally requested data. A response to the request is generated for the application that includes the complete result set in the database-specific format.

17 Claims, 5 Drawing Sheets

U.S. PATENT DOCUMENTS

| | | | |
|---|---|---|---|
| 6,145,066 A | 11/2000 | Atkin | 711/165 |
| 6,151,608 A * | 11/2000 | Abrams | 707/100 |
| 6,182,089 B1 * | 1/2001 | Ganapathy et al. | 707/206 |
| 6,269,382 B1 * | 7/2001 | Cabrera et al. | 707/204 |
| 6,336,122 B1 | 1/2002 | Lee et al. | 707/204 |
| 6,434,568 B1 * | 8/2002 | Bowman-Amuah | 707/10 |
| 6,505,244 B1 | 1/2003 | Natarajan et al. | 709/223 |
| 6,577,638 B1 | 6/2003 | Tashiro et al. | 370/401 |
| 6,598,134 B2 * | 7/2003 | Ofek et al. | 709/217 |
| 6,691,116 B1 | 2/2004 | Bart | 707/10 |
| 7,149,730 B2 * | 12/2006 | Mullins et al. | 707/2 |
| 2002/0040405 A1 * | 4/2002 | Gold | 709/217 |
| 2002/0143976 A1 | 10/2002 | Barker et al. | 709/231 |
| 2002/0161855 A1 * | 10/2002 | Manczak et al. | 709/219 |
| 2002/0174098 A1 | 11/2002 | Wu et al. | |
| 2003/0154264 A1 | 8/2003 | Martin et al. | 709/221 |
| 2004/0010572 A1 | 1/2004 | Watanabe | 709/220 |
| 2004/0049513 A1 * | 3/2004 | Yakir et al. | 707/100 |
| 2004/0049553 A1 * | 3/2004 | Iwamura et al. | 709/213 |
| 2004/0054718 A1 | 3/2004 | Hicks, III et al. | 709/203 |

FOREIGN PATENT DOCUMENTS

| | | |
|---|---|---|
| GB | 2 296 799 A | 7/1996 |

* cited by examiner

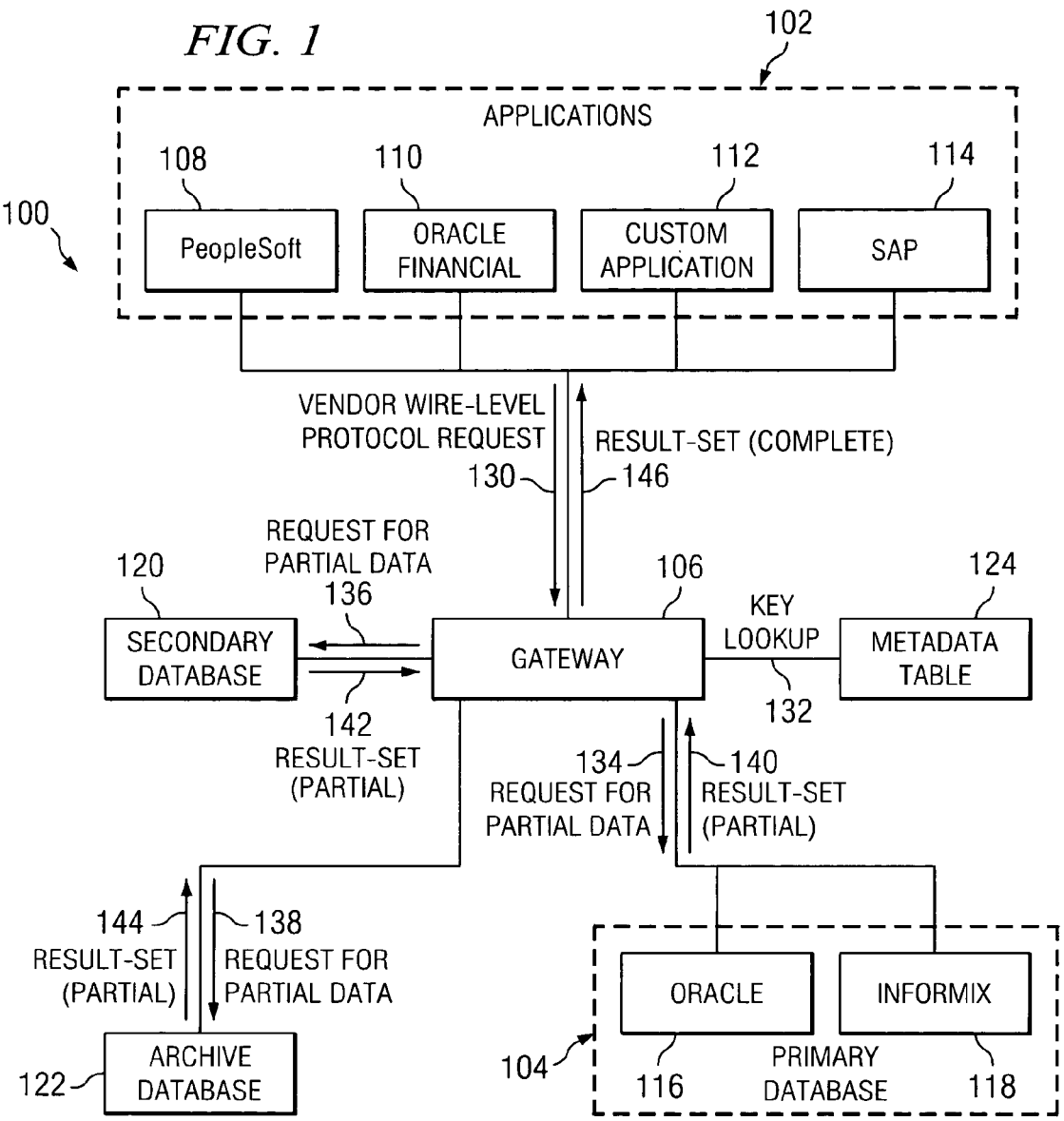

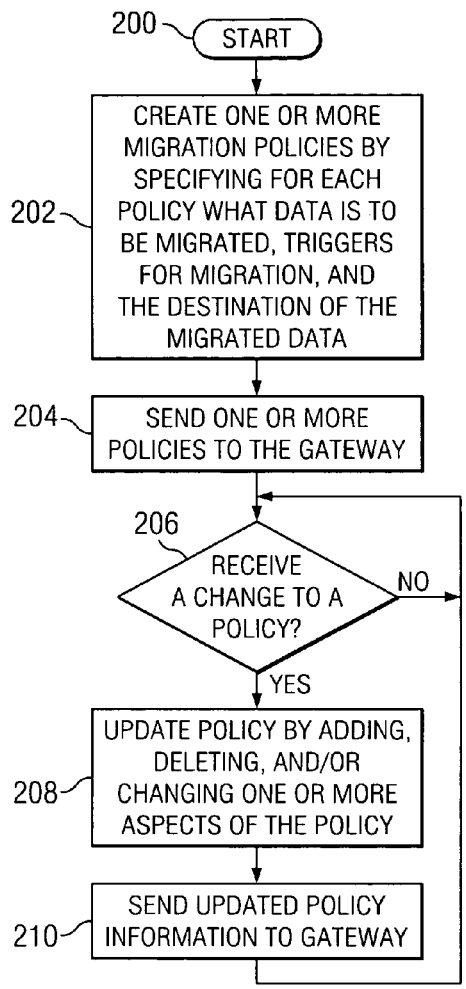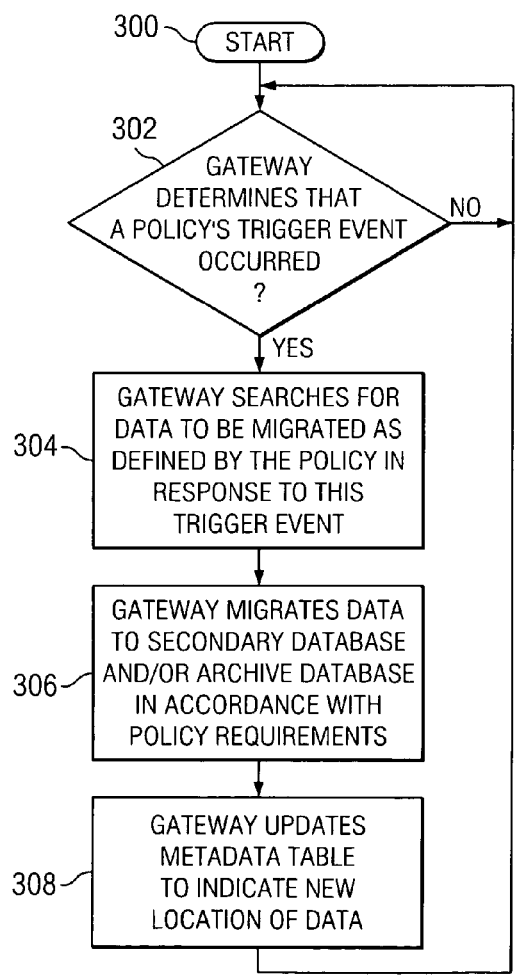

FIG. 6A
BEFORE ARCHIVING

| CLAIM | POLICY | SETTLEMENT DATE | PICTURE(S) (BLOB) |
|-------|--------|-----------------|-------------------|
| Xyz   | Abc    | 06/01/99        | X'0D0C00000F0E...' |
| Qrs   | Abc    | 09/10/03        | X'0F000000FE0F2...' |
| Ghi   | Abc    |                 | X'00DEAD00BEEF...' |

FIG. 6B
AFTER ARCHIVING

PRIMARY DATA-STORE

| CLAIM | POLICY | SETTLEMENT DATE | PICTURE(S) (BLOB) |
|-------|--------|-----------------|-------------------|
| Xyz   | Abc    | 06/01/99        |                   |
| Qrs   | Abc    | 09/10/03        | X'0F000000FE0F2...' |
| Ghi   | Abc    |                 | X'00DEAD00BEEF...' |

SECONDARY DATA-STORE

| CLAIM | POLICY | PICTURE(S) (BLOB) |
|-------|--------|-------------------|
| Xyz   | Abc    | X'0D0C00000F0E... |
|       |        |                   |
|       |        |                   |

METHOD, APPARATUS, AND COMPUTER PROGRAM PRODUCT FOR AUTOMATICALLY MIGRATING AND MANAGING MIGRATED DATA TRANSPARENTLY TO REQUESTING APPLICATIONS

BACKGROUND OF THE INVENTION

1. Technical Field

The present invention is directed to data storage data processing systems. More specifically, the present invention is directed to a method, apparatus, and computer program product for automatically selecting and migrating data and then responding to requests to access the migrated data transparently to applications that access the data.

2. Description of Related Art

A data storage data processing system typically includes one or more applications that access one or more databases. The applications are directly connected to each one of the databases. Thus, when an application needs to access a database, the application sends requests, such as Create, Retrieve, Update, or Delete requests, to the database using a vendor specific protocol.

When an application needs to access a database, the application will issue a request. The request is in a format, also referred to herein as a vendor specific protocol, which is required by the database that the application is attempting to access. For example, an application might issue a request to access an Oracle database. This request is in an Oracle format. The application expects to receive a result set back from the Oracle database in response to the request in that same Oracle format. The result set the application expects to receive back from the Oracle database will include all of the data requested by application. Thus, the application issues a request directly to a database in a database-specific format. The application then expects to receive a response from the database that includes a complete result set of all of the data requested by the application. The application expects the response to also be in the database-specific format.

It may be desirable to migrate data from one database to another. When data is migrated, the applications must be made aware of the new location of the data. When an application needs to access data where some of that data has been migrated, the application itself must retrieve the data from each location by issuing a request for data from each database in each database's database-specific format. For example, if the data is located in two different databases, the application must issue a first request for data from the first database in the first database's specific format and also issue a second request for data from the second database in the second database's specific format. The application will then receive a partial result set from each source that the application must assemble to form a complete result set. The data to satisfy the application's needs comes from two sources. The application must assemble the data responses from each database.

Therefore, a need exists for a method, apparatus, and computer program product for automatically selecting and migrating data and then responding to requests to access the migrated data transparently to applications that access the data.

SUMMARY OF THE INVENTION

A method, apparatus, and computer program product are disclosed for managing and migrating data. A request is received from an application for data. The request is in a database-specific format that adheres to a database-specific protocol. A determination is made regarding whether the data is located in a first database that utilizes the database-specific format. In response to determining that at least part of the data has been migrated from the first database, each current location of each part of the data is identified. A first request is generated for a first location of a first part of the data. The first request is in a database-specific format of the first location. A second request is generated for a second location of a second part of said data. The second request is in a database-specific format of the second location. The first and second parts of the data are combined into a complete result set that includes all of the originally requested data. A response to the request is generated for the application that includes the complete result set in the same database-specific format used in the original request from the application.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data storage data processing system in accordance with the present invention;

FIG. 2 depicts a high level flow chart that illustrates the creation of a migration policy in accordance with the present invention;

FIG. 3 illustrates a high level flow chart that depicts a gateway implementing a migration policy in accordance with the present invention;

FIG. 6A depicts a block diagram of a primary database that stores all data in accordance with the present invention; and FIG. 6B illustrates a primary database and a secondary database after some data has been migrated from the primary database to the secondary database in accordance with the present invention.

DETAILED DESCRIPTION OF THE PREFERRED EMBODIMENT

Figure 4:
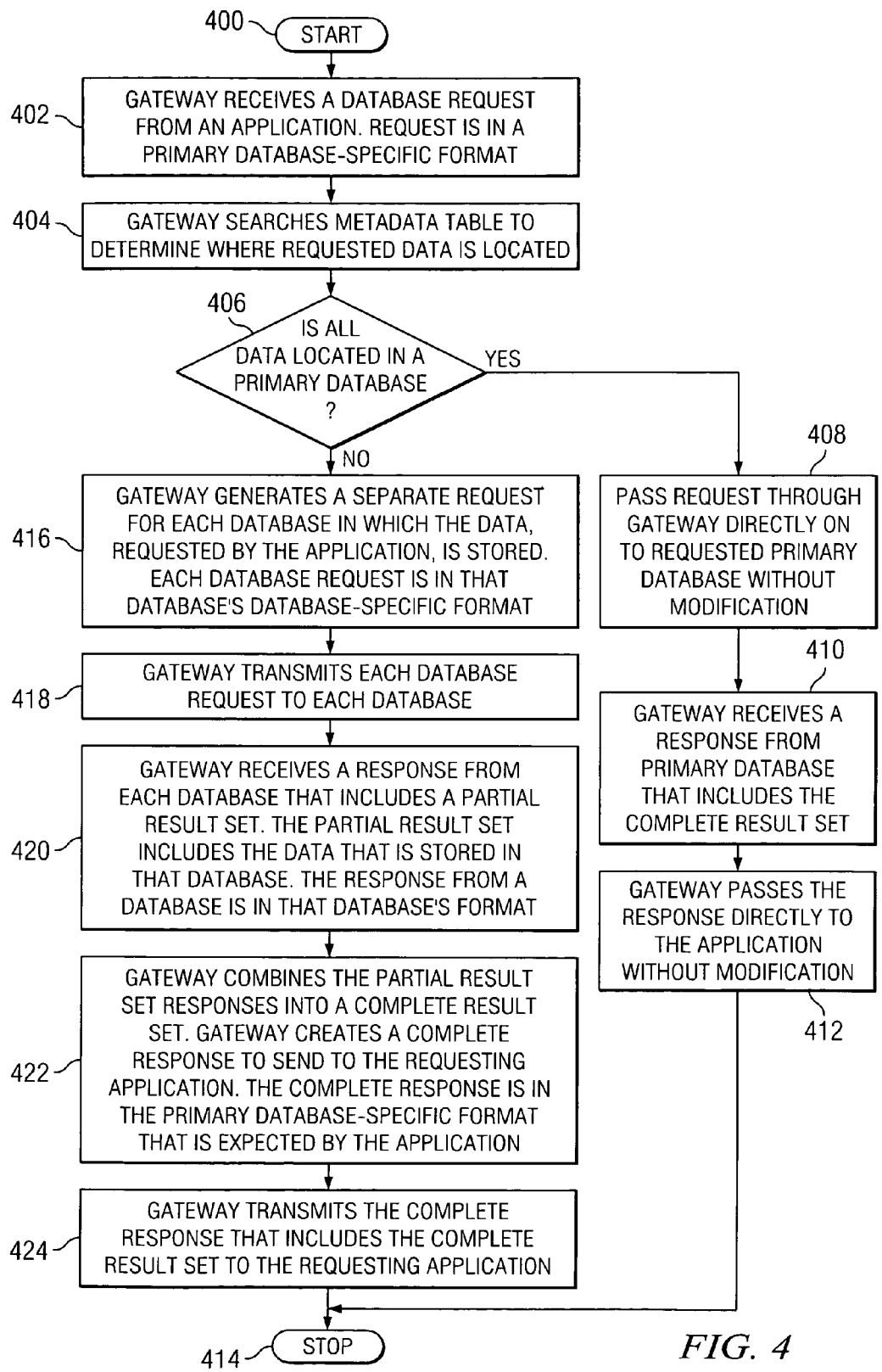
FIG. 4 depicts a high level flow chart that illustrates a gateway retrieving data from multiple databases and combining the retrieved data into a response that includes a complete result set in accordance with the present invention.

A preferred embodiment of the present invention and its advantages are better understood by referring to the figures, like numerals being used for like and corresponding parts of the accompanying figures.

The present invention is a method, apparatus, and computer program product for automatically selecting and migrating data and then responding to requests to access the migrated data transparently to applications that request to access the data. The invention exists in an environment that includes multiple different databases that are accessed by multiple different applications. The present invention is a method, system, and computer program product that provides a gateway between primary databases and applications that need to access the databases. The gateway is located between the applications and the databases.

The applications and the databases send, receive, and respond to requests in the typical manner consistent with the prior art. Thus, an application will send a request assuming that all of the data it is requesting will be found in the primary database that it believes it is accessing. Each database also responds to requests in a manner that is known in the prior art. Thus, a particular database will respond to a request in that database's particular database-specific format.

According to the present invention, portions of the data that would ordinarily be stored in one of the primary database are migrated from that primary database to either a secondary database or an archive database. When an application sends a request for data to one of the multiple different databases, the gateway intercepts the request and determines whether the request requests data that has been migrated out of its primary database to a secondary database, an archive database, or both. If the request does not request data that has been migrated, the request is passed through to the primary database to be processed according to normal known procedures. According to the present invention, if the request does request data that has been migrated, the gateway accesses a metadata structure that includes information about where the migrated data can be found. The metadata structure maintains the keys or other information that are necessary in order to find where various parts of the data are now located.

The gateway converts the single request from the application into several different requests. Thus, for example, the application may be attempting to retrieve data from a particular primary database. One part of this data may have been migrated to a secondary database and a second part of the data may have been migrated to the archive database. A third part of the data may remain in the primary database. Thus, when the gateway receives the request from the application in the primary database's format, the gateway will generate three different requests. One request will be in the primary database's format and will request just that data that is stored in the primary database. A second request will be in the secondary database's format and will request just that data that is stored in the secondary database. A third request will be in the archive database's format and will request just that data that is stored in the archive database.

The gateway then transmits these requests to the primary, secondary, and archive databases which will then access the data as requested. Each database will response to the request from the gateway by accessing the data as requested and providing back to the gateway a response that includes the data that was stored in that particular database. Each database will respond back to the gateway using the database's database-specific format. The gateway will then combine all of the retrieved data from the responses from each database into one single response. The gateway will put the response in the database-specific format that the application is expecting and then send that one response back to the requesting application. Thus, the single response sent back to the application contains a complete result set of all requested data and is in the format expected by the application. In this manner, the application is unaware that the data had been found in multiple databases.

The present invention provides for setting policies that define what type of data is to be migrated, what event or events trigger the migration, and where to store the migrated data. The migration then takes place dynamically and automatically as the trigger events occur. This requires updating of the metadata structure in order to be able to continually locate data that may have been migrated in response to a trigger event.

Thus, the present invention acts as a virtual primary database to each application. An application transmits requests to the gateway which then executes the requests in the manner expected by the application. The actions of the gateway are completely hidden from the applications and from the databases themselves.

FIG. 1 is a block diagram of a data storage data processing system 100 in accordance with the present invention. System 100 includes a plurality of applications 102 that store and retrieve data from a primary database 104. Applications 102 issue requests to access one of the primary databases 104. An application issues a request in a particular database format for the particular primary database that the application is intending to access.

According to the present invention, a gateway 106 is provided between applications 102 and primary databases 104. Gateway 106 will receive a request from an application in a particular database-specific format. Gateway 106 then either forwards that request to the appropriate primary database if none of the data has been migrated, or generates several requests in different formats for multiple databases in order to retrieve the partial result set that is stored in each database. Gateway 106 then receives the partial result set(s) from these databases, forms a response that includes a complete result set, and then sends that response back to the requesting application in the same particular database-specific format that is expected by the application.

Applications 102 may include, for example, a PeopleSoft application 108, an Oracle Finance application 110, a custom application 112, and an SAP application 114. Other vendor's applications may be included.

Primary databases 104 include, for example, an Oracle database 116, and an Informix database 118. Other vendor's databases or a custom database may be included.

When one of the applications needs to access a primary database, the application will issue a request. That request is in a format that is required by the primary database that the application is attempting to access. For example, custom application 112 may issue a request to access the Oracle database 116. Thus, application 112 issues a request in an Oracle format. Application 112 expects to receive a single response that includes the complete result set back from Oracle database 116 in that same Oracle format. The result set that application 112 expects to receive back from Oracle database 116 includes all of the data requested by application 112.

Data storage database system 100 also includes a secondary database 120. Secondary database 120 stores data that will likely be accessed less frequently than the data that is stored in primary databases 104. In addition, an archive database 122 may also be included. Archive database 122 stores data that will likely be accessed less frequently than the data that is stored in either secondary database 120 or primary databases 104.

A metadata table 124 is included. Metadata table 124 includes information that identifies where data that has been migrated is currently located. For example, once data has been migrated from primary database 104 to either secondary database 120 or archive database 122, primary and secondary keys or other information will be stored in metadata table 124 that can be used by gateway 106 to locate where that data is currently stored.

According to the present invention, when gateway 106 receives a request, such as request 130 which is in a primary database-specific format, from an application, gateway 106 will access metadata table 124 using key lookup 132 to determine whether the request 130 is requesting data that has been migrated from a primary database 104 to another location. Key lookup 132 will provide the current location of the data if that data has been migrated. If gateway 106 determines that none of the requested data has been migrated, gateway 106 passes the request 130 straight through gateway 106 to the appropriate primary database 104 which then executes the request and provides a complete result set. This complete result set 146 is in the primary database-specific format. This complete result set 146 is then received by gateway 106 and passed straight through gateway 106 and back to the requesting application. Gateway 106 does not modify the application's request or the primary database's response in this case.

If gateway 106 determines that some or all of the requested data has been migrated, gateway 106 uses key lookup information 132 to determine where that data is currently located. Gateway 106 then generates a request for each location that requests the data that is stored in that location. A location's request from gateway 106 is in the location-specific format. For example, if some of the data requested by the application is located in a particular one of the primary databases 104, some of the data is located in secondary database 120, and some of the requested data is located in archive database 122, gateway 106 will generate a request 134 for a partial result set from the particular one of the primary databases 104. Gateway 106 will also generate a request 136 for a partial result set from secondary database 120 and a request 138 for another partial result set from archive database 122. Request 134 is in the particular primary database's format. Request 136 is in the secondary database's format. Request 138 is in the archive database's format.

The particular one of primary databases 104 will respond to request 134 by transmitting a partial result set 140 back to gateway 106. Partial result set 140 is in the primary database's database-specific format. Secondary database 120 will respond to request 136 by transmitting a partial result set 142 back to gateway 106. Partial result set 142 is in the secondary database's database-specific format. Archive database 122 will respond to request 138 by transmitting a partial result set 144 back to gateway 106. Partial result set 144 is in the archive database's database-specific format.

Gateway 106 will then take the data from each one of the partial result sets 140, 142, and 144 to form a complete result set. Gateway 106 then generates a response 146 to the requesting application that includes the complete result set. This response is in the same database-specific format of the application's request. Gateway 106 then transmits the complete result set response 146 back to the requesting application. In this manner, the application is completely unaware that the requested data was located in more than one storage location. The gateway's actions are completely transparent to the application. The application generates a request in a particular database-specific format and receives a complete result set response in that same database-specific format regardless of where the data was actually located.

FIG. 2 depicts a high level flow chart that illustrates the creation of a migration policy in accordance with the present invention. The process starts as depicted by block 200 and thereafter passes to block 202 which illustrates creating one or more migration policies by specifying for each policy what data is to be migrated, one or more triggers for migrating this data, and the desired destination of the migrated data. Next, block 204 illustrates sending these one or more policies to the gateway system. The process then passes to block 206 which depicts a determination of whether or not a change to one of the policies has been received. If a determination is made that no change to any policy has been received, the process passes back to block 206.

Referring again to block 206, if a determination is made that a change to a policy has been received, the process passes to block 208. Block 208 illustrates updating a policy by adding, deleting, and/or changing one or more aspects of that policy, such as by specifying different trigger events, specifying different data, and/or specifying different migration destinations. Next, block 210 depicts sending the updated policy information to the gateway. The process then passes back to block 206.

FIG. 3 illustrates a high level flow chart that depicts a gateway implementing a migration policy in accordance with the present invention. The process starts as depicted by block 300 and thereafter passes to block 302 which illustrates a determination of whether or not the gateway determines that a policy's trigger event has occurred. If a determination is made that a policy's trigger event has not occurred, the process passes back to block 302. Referring again to block 302, if a determination is made that a policy's trigger event has occurred, the process passes to block 304 which depicts the gateway searching for data to be migrated as defined by the policy in response to the trigger event.

The process then passes to block 306 which illustrates the gateway migrating data to a secondary database and/or an archive database in accordance with the policy's requirements. The policy may specify that all of the data is migrated, that only part of the data is migrated to one location, or that different parts of the data are migrated to different locations. Block 308, then, depicts the gateway updating the metadata table to indicate a new location for all of the migrated data. The process then passes back to block 302.

FIG. 4 depicts a high level flow chart that illustrates a gateway retrieving data from multiple databases and combining the retrieved data into a response that includes a complete result set in accordance with the present invention. The process starts as depicted by block 400 and thereafter passes to block 402 which illustrates the gateway receiving a database request from an application. This database request is in a primary database-specific format. The gateway is capable of processing requests in any of multiple different formats.

Next, block 404 depicts the gateway searching the metadata table to determine where the requested data is currently located. The process then passes to block 406 which illustrates a determination of whether all of the data is located in a primary database. If a determination is made that all of the data is located in a primary database, the process passes to block 408 which depicts the gateway passing the request through the gateway directly on to the requested primary database without modification. Thus, in this case the gateway acts as a pass-through device that receives and then forwards the application's request without modifying the request.

Thereafter, block 410 illustrates the gateway receiving a response from the primary database that includes the complete result set that satisfies the application's request. The complete result set is received from the primary database in the primary database-specific format. Next, block 412 depicts the gateway passing the response directly to the requesting application without modification. The gateway again acts as a pass-through device that passes the complete result set from the primary database to the requesting application. The process then passes to block 414.

Referring again to block 406, if a determination is made that not all of the data is located in a primary database, the process passes to block 416 which illustrates the gateway generating a separate request for each database in which part of the requested data is stored. Each database request is in that database's database-specific format. Next, block 418 depicts the gateway transmitting each database request to that database.

The process then passes to block 420 which illustrates the gateway receiving a response from each database that includes a partial result set. The partial result set includes the data that is stored in that database. The response from a database is in that database's format. Block 422, then, depicts the gateway combining the data from the partial result sets received from the various databases into a complete result set. The gateway creates a complete response to send to the requesting application. The complete response is in the primary database-specific format that is expected by the application. Next, block 424 illustrates the gateway transmitting the complete response that includes the complete result set to the requesting application. The process then passes to block 414.

Figure 5:
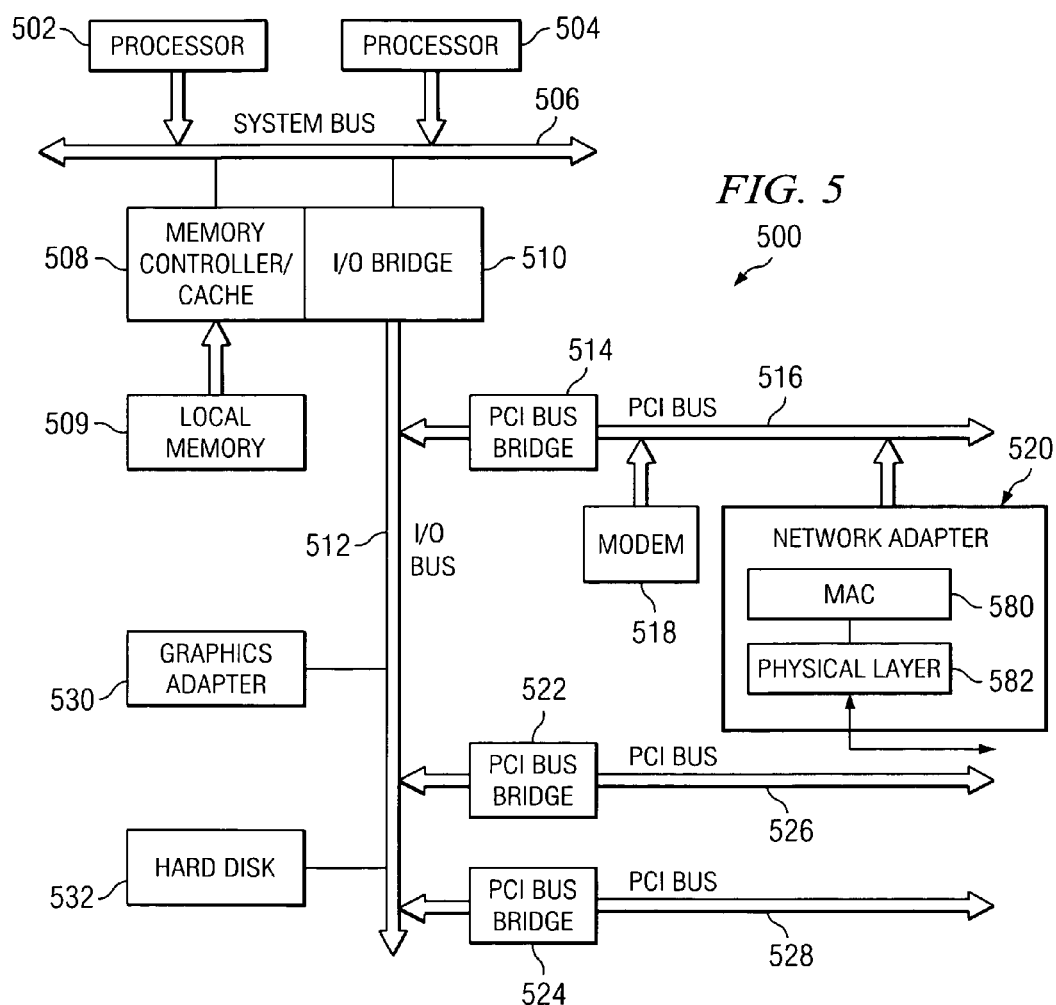
FIG. 5 is a block diagram of a computer system that includes the present invention in accordance with the present invention.

FIG. 5 is an illustration of a computer system that may be used to implement the present invention in accordance with the present invention. Data processing system 500 may be a multiprocessor system including a plurality of processors 502 and 504 connected to system bus 506. Alternatively, a single processor system may be employed.

Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI bus 516. Typical PCI bus implementations will support four PCI expansion slots or add-in connectors. Communications links to other computers may be provided through modem 518 and network adapter 520 connected to PCI local bus 516 through add-in boards.

Network adapter 520 includes a physical layer 582 which conditions analog signals to go out to the network, such as for example an Ethernet network over an R45 connector. A media access controller (MAC) 580 is included within network adapter 520. Media access controller (MAC) 580 is coupled to bus 516 and processes digital network signals. MAC 580 serves as an interface between bus 516 and physical layer 582. MAC 580 performs a number of functions involved in the transmission and reception of data packets. For example, during the transmission of data, MAC 580 assembles the data to be transmitted into a packet with address and error detection fields. Conversely, during the reception of a packet, MAC 580 disassembles the packet and performs address checking and error detection. In addition, MAC 580 typically performs encoding/decoding of digital signals transmitted and performs preamble generation/removal as well as bit transmission/reception.

Additional PCI bus bridges 522 and 524 provide interfaces for additional PCI buses 526 and 528, from which additional modems or network adapters may be supported. In this manner, data processing system 500 allows connections to multiple network computers. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The following is an example of one application of the present invention. A business practice might suggest that settled vehicle insurance claims which are one year or older do not need to have the picture(s) of the vehicle damage maintained in the primary database. These pictures should be kept for five years, however. Claim information, without the pictures, should be kept for twenty years.

The following three policies are then created in order to implement the business practice. (1) On a daily basis, all claims that are stored on a primary database are checked to determine whether the claim was settled more than two years ago. Any pictures that are stored with claims that were settled more than two years ago are migrated from the primary database to the secondary database. (2) On a weekly basis, the secondary database is checked to determine whether there are any stored pictures that are associated with claims that are more than five years old. Any pictures that are associated with claims that are more than five years old are migrated from the secondary storage to the archive database. (3) On a monthly basis, the archived database is checked to determine whether there are any stored pictures that are associated with claims that are more than 20 years old. Any pictures that are associated with claims that are more than 20 years old that have not been accessed in the last 180 days are then deleted.

FIG. 6A depicts a block diagram of a primary database that stores all data in accordance with the present invention. Primary database 600 includes a table 602 of data. Table 602 includes three entries, each one of an insurance claim. Each entry contains an insurance policy number, a claim number, a settlement date, and a picture or collection of pictures of a vehicle associated with the claim.

For example, table 602 includes an entry for claim Xyz for policy Abc that was settled on Jun. 1, 1999. There are pictures 603 that are stored in primary database 600 for this claim. There is an entry for claim Qrs for policy Abc that was settled on Sep. 10, 2003. There are pictures stored for this claim. And, there is an entry for claim Ghi for policy Abc that does not have a settlement date. There are pictures stored for this claim. If the current date is Sep. 10, 2004, a determination will be made that the pictures 603 for claim Xyz are associated with a claim that is more than two years old and that the pictures for claims Qrs and Ghi are not associated with claims that are more than two years old. Therefore, the pictures data 603 should be migrated from primary database 600 to a secondary database.

FIG. 6B illustrates a primary database and a secondary database after data has been migrated from the primary database to the secondary database in accordance with the present invention. Primary database 604 includes a table 606 having three entries. The data in table 606 is the same as the data in table 602 with one difference. The pictures data 603 for claim Xrz has been migrated from primary database 604 to secondary database 608. Secondary database 608 now includes a table 610 which includes the pictures 603 themselves as well as the key information regarding the claim and policy that are needed to properly identify the pictures 603.

It is important to note that while the present invention has been described in the context of a fully functioning data processing system. Those of ordinary skill in the art will appreciate that the processes of the present invention are capable of being distributed in the form of a computer readable medium of instructions and a variety of forms. Examples of computer readable storage medium includes recordable-type media such as a floppy disk, a hard disk drive, a RAM, CD-ROMs, DVD-ROMs. Examples of computer readable media include transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data storage data processing system for managing and migrating data, the method being implemented by a computer system having one or more processors, said method comprising:

receiving a request from an application for data, said request being in a database-specific format of a first database;

determining whether said data is located in said first database that utilizes said database-specific format; and in response to determining that at least part of said data has been migrated from said first database:

generating a first request for a first location of a first part of said data, said first request being in a database-specific format of said first location;

generating a second request for a second location of a second part of said data, said second request being in a database-specific format of said second location;

receiving said first and second parts of said data;

combining said first and second parts of said data into a complete result set;

generating a response to said request for said application that includes said complete result set in said database-specific format; and creating a migration policy that identifies data to be migrated, a destination for said data to be migrated, and at least one trigger for causing said data to be migrated;

in response to said trigger occurring, migrating said data to said destination; and said application continuing to access said data while being unaware that said data had been found in multiple databases.

2. The method according to claim 1, further comprising:

receiving a first response that includes said first part of said data from said first location, said first response being in said database-specific format of said first location; and receiving a second response that includes said second part of said data from said second location, said second response being in said database-specific format of said second location.

3. The method according to claim 1, further comprising:

in response to determining that none of said data has been migrated from said first database, passing said request from said application directly to said first database without modifying said request;

receiving from said first database a response to said request, said response being in said database-specific format; and passing said response from first database directly to said application without modifying said response.

4. The method according to claim 1, further comprising:

generating a first request for a first location of a first part of said data further including generating a first request for a primary database, said first database being said primary database, said primary database storing non-migrated data; and generating a second request for a second location of a second part of said data further including generating a second request for a secondary database, said secondary database storing migrated data.

5. The method according to claim 1, further comprising:

migrating said first part of said data to a secondary database;

migrating said second part of said data to an archive database; and leaving a third part of said data in said first database, said first database being a primary database.

6. The method according to claim 5, further comprising:

generating a first request for a first location of a first part of said data further including generating a first request for said secondary database, said first request being in a database-specific format of said secondary database;

generating a second request for a second location of a second part of said data further including generating a second request for said archive database, said archive database storing migrated data, said second request being in a database-specific format of said archive database;

generating a third request for said primary database for said third part of said data, said primary database storing non-migrated data, said third request being in a database-specific format of said primary database;

receiving a first partial result set from said secondary database that includes said first part of said data;

receiving a second partial result set from said archive database that includes said second part of said data;

receiving a third partial result set from said primary database that includes said third part of said data;

combining said first, second, and third parts of said data into a complete result set; and generating a response to said request for said application that includes said complete result set in said database-specific format.

7. An apparatus in a data storage of a memory data processing system for managing and migrating data, said apparatus comprising:

a computer system having one or more processors, the computer system executing an application that issues a request for data, said request being in a database-specific format of a first database;
a gateway located between said application and said first database;
said gateway determining whether said data is located in said first database that utilizes said database-specific format; and
in response to determining that at least part of said data has been migrated from said first database:
said gateway generating a first request for a first location of a first part of said data, said first request being in a database-specific format of said first location;
said gateway generating a second request for a second location of a second part of said data, said second request being in a database-specific format of said second location;
said gateway receiving said first and second parts of said data;
said gateway combining said first and second parts of said data into a complete result set;
said gateway generating a response to said request for said application that includes said complete result set in said database-specific format;
said gateway receiving a migration policy that identifies data to be migrated, a destination for said data to be migrated, and at least one trigger for causing said data to be migrated;
in response to said trigger occurring, said gateway migrating said data to said destination; and
said application continuing to access while being unaware that said data had been found in multiple databases.

8. The apparatus according to claim 7, further comprising:
said gateway receiving a first response that includes said first part of said data from said first location, said first response being in said database-specific format of said first location; and
said gateway receiving a second response that includes said second part of said data from said second location, said second response being in said database-specific format of said second location.

9. The apparatus according to claim 7, further comprising:
in response to determining that none of said data has been migrated from said first database, said gateway passing said request from said application directly to said first database without modifying said request;
said gateway receiving from said first database a response to said request, said response being in said database-specific format; and
said gateway passing said response from first database directly to said application without modifying said response.

10. The apparatus according to claim 7, further comprising:
said gateway generating a first request for a first location of a first part of said data further including generating a first request for a primary database, said first database being said primary database, said primary database storing non-migrated data; and
said gateway generating a second request for a second location of a second part of said data further including generating a second request for a secondary database, said secondary database storing migrated data.

11. The apparatus according to claim 7, further comprising:
said gateway migrating said first part of said data to a secondary database;
said gateway migrating said second part of said data to an archive database; and
said gateway leaving a third part of said data in said first database, said first database being a primary database.

12. The apparatus according to claim 11, further comprising:
said gateway generating a first request for a first location of a first part of said data further including generating a first request for said secondary database, said first request being in a database-specific format of said secondary database;
said gateway generating a second request for a second location of a second part of said data further including generating a second request for said archive database, said archive database storing migrated data, said second request being in a database-specific format of said archive database;
said gateway generating a third request for said primary database for said third part of said data, said primary database storing non-migrated data, said third request being in a database-specific format of said primary database;
said gateway receiving a first partial result set from said secondary database that includes said first part of said data;
said gateway receiving a second partial result set from said archive database that includes said second part of said data;
said gateway receiving a third partial result set from said primary database that includes said third part of said data;
said gateway combining said first, second, and third parts of said data into a complete result set; and
said gateway generating a response to said request for said application that includes said complete result set in said database-specific format.

13. A computer readable storage medium having encoded thereon instruction that is executed by one of processors in the computer systems to implement the following steps:
receiving a request from an application for data, said request being in a database-specific format of a first database;
determining whether said data is located in said first database that utilizes said database-specific format; and
in response to determining that at least part of said data has been migrated from said first database:
generating a first request for a first location of a first part of said data, said first request being in a database-specific format of said first location;
generating a second request for a second location of a second part of said data, said second request being in a database-specific format of said second location;
receiving said first and second parts of said data; combining said first and second parts of said data into a complete result set; and
generating a response to said request for said application that includes said complete result set in said database-specific format;
creating a migration policy that identifies data to be migrated, a destination for said data to be migrated and at least one trigger for causing said data to be migrated; and in response to said trigger occurring, migrating said data to said destination; and wherein said application continues to access said data while being unaware that said data had been found in multiple databases.

14. The computer readable medium according to claim 13, further comprising:

receiving a first response that includes said first part of said data from said first location, said first response being in said database-specific format of said first location; and receiving a second response that includes said second part of said data from said second location, said second response being in said database-specific format of said second location.

15. The computer readable storage medium according to claim 13, further comprising:

in response to determining that none of said data has been migrated from said first database, instructions for passing said request from said application directly to said first database without modifying said request;

receiving from said first database a response to said request, said response being in said database-specific format; and passing said response from first database directly to said application without modifying said response.

16. The computer readable storage medium according to claim 13, further comprising:

migrating said first part of said data to a secondary database; instructions for migrating said second part of said data to an archive database; and leaving a third part of said data in said first database, said first database being a primary database.

17. The computer readable storage medium according to claim 16, further comprising:

generating a first request for a first location of a first part of said data further including generating a first request for said secondary database, said first request being in a database-specific format of said secondary database;

generating a second request for a second location of a second part of said data further including generating a second request for said archive database, said archive database storing migrated data, said second request being in a database-specific format of said archive database;

generating a third request for said primary database for said third part of said data, said primary database storing non-migrated data, said third request being in a database-specific format of said primary database;

receiving a first partial result set from said secondary database that includes said first part of said data;

receiving a second partial result set from said archive database that includes said second part of said data;

receiving a third partial result set from said primary database that includes said third part of said data;

combining said first, second, and third parts of said data into a complete result set; and generating a response to said request for said application that includes said complete result set in said database-specific format.

* * * * *